United States Patent [19]

Krämer et al.

[11] 4,354,968
[45] Oct. 19, 1982

[54] AZO REACTIVE DYESTUFFS HAVING AN ARYL-TRIAZINYL-ARYL DIAZO COMPONENT

[75] Inventors: Erich Krämer; Horst Nickel, both of Leverkusen; Karl-Heinz Schündehütte, Opladen, all of Fed. Rep. of Germany

[73] Assignee: Bayer Aktiengesellschaft, Leverkusen, Fed. Rep. of Germany

[21] Appl. No.: 23,750

[22] Filed: Mar. 26, 1979

Related U.S. Application Data

[63] Continuation of Ser. No. 827,374, Aug. 24, 1977, abandoned, which is a continuation of Ser. No. 335,247, Feb. 23, 1973, abandoned.

[30] Foreign Application Priority Data

Feb. 25, 1972 [DE] Fed. Rep. of Germany ....... 2208972

[51] Int. Cl.$^3$ .................. C09B 45/00; C09B 45/24; C09B 29/22
[52] U.S. Cl. ............... 260/146 T; 260/146 R; 260/146 D; 260/147; 260/153; 260/154; 260/155; 260/156; 260/157; 260/158; 260/162
[58] Field of Search .......... 260/146 R, 146 D, 146 T, 260/147, 153, 154, 155, 156, 157, 158, 162

[56] References Cited

U.S. PATENT DOCUMENTS

| | | | |
|---|---|---|---|
| 3,040,022 | 6/1962 | Starn | 260/153 |
| 3,222,352 | 12/1965 | Monagle | 260/157 |
| 3,320,231 | 5/1967 | Ammann et al. | 260/153 |
| 3,326,887 | 6/1967 | Riat et al. | 260/153 |

FOREIGN PATENT DOCUMENTS

| | | | |
|---|---|---|---|
| 906729 | 9/1962 | United Kingdom | 260/157 |
| 996501 | 6/1965 | United Kingdom | 260/146 R |
| 998358 | 7/1965 | United Kingdom | 260/157 |
| 1002232 | 8/1965 | United Kingdom | 260/157 |
| 1182761 | 3/1970 | United Kingdom | 260/146 R |

*Primary Examiner*—John F. Niebling
*Attorney, Agent, or Firm*—Sprung, Horn, Kramer & Woods

[57] ABSTRACT

Optionally metallized azo dyestuffs which in the form of the free acid correspond to the formula

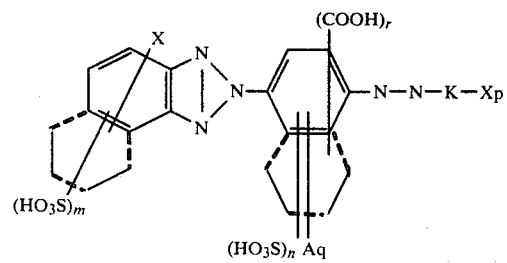

wherein
K is the radical of a benzene, naphthalene, pyrazolone, pyridone, pyrimidone, acetoacetic acid arylide or aminopyrazole coupling component;
A is a non-ionic substituent;
X is

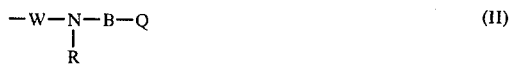

wherein
W is a direct bond or a bridge member to a C atom of the benzene or naphthalene nucleus or the coupling component K;
R is hydrogen or $C_1$–$C_4$-alkyl;
B is a direct bond or a bridge member, especially -CO- or -$SO_2$-, to a C atom of Q;
Q is a reactive radical;
m is 0, 1 or 2;
n is 0, 1 or 2;
p is 0 or 1;
q is 0, 1 or 2; and
r is 0 or 1;
and their use for the dyeing and printing of natural and regenerated cellulose fibre materials such as cotton and rayon, as well as natural and synthetic polyamide fibre materials, for example those of wool, silk, poly-ε-caprolactam or polycondensate of hexamethylene-diamine and adipic acid. The dyeings obtained, espeically those on cotton and rayon, are distinguished by good fastness properties, especially fastness to wet processing and to light.

2 Claims, No Drawings

AZO REACTIVE DYESTUFFS HAVING AN ARYL-TRIAZINYL-ARYL DIAZO COMPONENT

This is a Continuation, of Ser. No. 827,374 filed Aug. 24, 1977, now abandoned, which is a Continuation of Ser. No. 335,247 filed Feb. 23, 1973, now abandoned.

The subject of the present invention are optionally metallised reactive azo dyestuffs which in the form of the free acid correspond to the formula

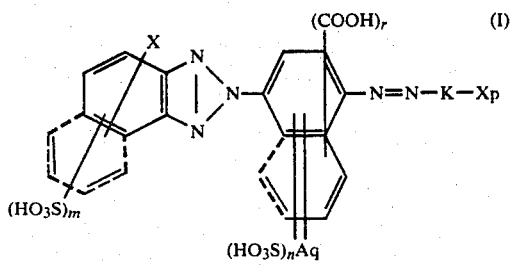

wherein
K = the radical of a coupling component, preferably of a coupling component of the benzene, naphthalene, pyrazolone, pyridone, pyrimidone, acetoacetic acid arylide or aminopyrazole series,
A = a non-ionic substituent,

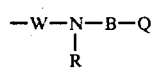

wherein
W = direct bonds or a bridge member to a C atom of the benzene or naphthalene nucleus or the coupling component K,
R = hydrogen or $C_1$-$C_4$-alkyl,
B = a direct bond or a bridge member, especially -CO- or -SO$_2$-, to a C atom of Q,
Q = a reactive radical;
m = 0, 1 or 2,
n = 0, 1 or 2,
p = 0 or 1,
q = 0, 1 or 2, and
r = 0 or 1,
and processes for their manufacture and their use for dyeing and printing fibre materials containing OH groups and fibre materials containing NH groups, such as cellulose, wool and synthetic polyamides.

By reactive radicals Q there are here understood those radicals or groupings which possess one or more groups capable of addition, or removable substituents, and which on application of the dyestuffs to cellulose materials in the presence of acid-binding agents and if necessary under the action of heat can react with the hydroxyl groups of cellulose, or on application to polyamide fibres, such as wool, can react with the NH groups of these fibres, to form covalent bonds. A large number of such fibre-reactive groupings are known from the literature.

Suitable reactive groups -B-Q which contain at least one removable substituent bonded to a heterocyclic radical are, amongst others, those which contain at least one removable substituent bonded to a 5-membered or 6-membered heterocyclic ring, such as to a monasine, diazine or triasine ring, for example a pyridine, pyrimidine, pyridazine, pyrazine, thiazine, oxazine or symmetrical triazine ring, or on a ring system of this nature which possesses one or more fused aromatic rings, such as a quinoline, phthalazine, cinnoline, quinazoline, quinoxaline, acridine, phenazine and phenanthridine ring system, or to a thiazole, isothiazole, benzthiazole, benzoxazole or benzimidazole radical. The 5- or 6-membered heterocyclic rings which possess at least one removable substituent are accordingly preferably those which contain one or more nitrogen atoms and can contain 5-membered or preferably 6-membered fused carbocyclic rings. As examples of the removable substituents on the heterocyclic structure there may be mentioned halogen, especially Cl, Br and F, ammonium, including hydrasinium, sulphonium, sulphonyl, such as alkylsulphonyl, especially optionally substituted $C_1$-$C_4$-alkylsulphonyl and arylsulphonyl, especially optionally substituted phenylsulphonyl, azido-($N_3$), mercapto, thioether, for example alkylthio, sulphinic acid and sulphonic acid.

In detail, examples to be mentioned are mono- or di-halogeno-symmetrical-triazinyl radicals, for example 2,4-dichlorotriazinyl-6, 2-amino-4-chlorotriazinyl-6, 2-alkylamino-4-chlorotriazinyl-6, such as 2-methylamino-4-chlorotriazinyl-6, 2-ethylamino- or 2-propylamino-4-chlorotriazinyl-6, 2-$\beta$-hydroxyethylamino-4-chlorotriazinyl-6, 2-di-$\beta$-hydroxyethylamino-4-chlorotriazinyl-6 and the corresponding sulphuric acid half-esters, 2-diethylamino-4-chlorotriazinyl-6, 2-morpholino- or 2-piperidino-4-chlorotriazinyl-6, 2-cyclohexylamino-4-chlorotriazinyl-6, 2-arylamino- and substituted arylamino-4-chlorotriazinyl-6, such as 2-phenylamino-4-chlorotriazinyl-6, 2-(o-, m- or p-carboxy- or sulpho-phenyl)-amino-4-chlorotriazinyl-6, 2-alkoxy-4-chlorotriazinyl-6, such as 2-methoxy- or ethoxy-4-chlorotriazinyl-6, 2-(phenylsulphonylmethoxy)-4-chlorotriazinyl-6, 2-aryloxy- and substituted aryloxy-4-chlorotriazinyl-6, such as 2-phenoxy-4-chlorotriazinyl-6, 2-(p-sulphophenyl)-oxy-4-chlorotriazinyl-6, 2-(o-, m- or p-methyl- or methoxyphenyl)-oxy-4-chloro-triazinyl-6, 2-alkylmercapto- or 2-arylmercapto- or 2-(substituted aryl)-mercapto-4-chlorotriazinyl-6, such as 2-$\beta$-hydroxyethyl)-mercapto-4-chlorotriazinyl-6, 2-phenylmercapto-4-chlorotriazinyl-6, 2-(4'-methylphenyl)-mercapto-4-chlorotriazinyl-6, 2-(2',4'-dinitro)-phenylmercapto-4-chlorotriazinyl-6, 2-methyl-4-chloro-triasinyl-6, and 2-phenyl-4-chlorotriasinyl-6, mono-, di- or tri-halogenopyrimidinyl radicals, such as 2,4-dichloropyrimidinyl-6, 2,4,5-trichloropyrimidinyl-6, 2,4-dichloro-5-nitro- or -5-methyl- or -5-carboxymethyl- or -5-carboxy- or -5-cyano- or -5-vinyl- or -5-sulpho- or -5-mono-, -di- or -trichloromethyl- or -5-carboalkoxypyrimidinyl-6, 2,6-dichloropyrimidine-4-carbonyl, 2,4-dichloropyrimidine-5-carbonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulphonyl, 2-chloroquinoxaline-3-carbonyl, 2- or 3-monochloroquinoxaline-6-carbonyl, 2- or 3-monochloroquinoxaline-6-sulphonyl, 2,3-dichloroquinoxaline-6-carbonyl, 2,3-dichloroquinoxaline-6-sulphonyl, 1,4-dichlorophthalazine-6-sulphonyl or -6-carbonyl, 2,4-dichloroquinasoline-7- or -6-sulphonyl or -carbonyl, 2- or 3- or 4-(4',5'-dichloropyridazon-6'-yl-1')-phenylsulphonyl or -carbonyl, $\beta$-(4'-5'-dichloropyridazon-6'-yl-1')-ethyl-carbonyl, N-methyl-N-(2,4-dichlorotriasinyl-6)-carbamyl, N-methyl-N-(2-methylamino-4- chlorotriazinyl-6)-carbamyl, N-methyl-N-(2-dimethylamino-4-chlorotriazinyl-6)-carbamyl, N-methyl- or N-ethyl-N-(2,4-dichlorotriazinyl-6)-amino-acetyl, N-methyl-N-(2,3-dichloroquinoxaline-6-sulphonyl)-amino-acetyl, N-methyl-N-(2,3-dichloroquinoxaline-6-carbonyl)-amino-acetyl as well as the corresponding bromine and fluorine derivatives of the abovementioned chlorine-substituted heterocyclic radicals including for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloro-methyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or -5-methylsulphonyl-4-pyrimidinyl, 2-fluoro-5-carbonamido-4-pyrimidinyl, 2-fluoro-5-carbomethoxy-4-pyrimidinyl, 2-fluoro-5-bromo-6-trifluoromethyl-4-pyrimidinyl, 2-fluoro-5-carbonamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 2,6-difluoro-5-methylsulphonyl-4-pyrimidinyl, 2-fluoro-5-sulphonamido-4-pyrimidinyl, 2-fluoro-5-chloro-6-carbomethoxy-4-pyrimidinyl and 2,6-difluoro-5-trifluoromethyl-4-pyrimidinyl; triazine radicals containing sulphonyl groups, such as 2,4-bis-(phenylsulphonyl)-triazinyl-6, 2-(3'-carboxyphenyl)-sulphonyl-4-chlorotriazinyl-6, 2-(3'-sulphophenyl)-sulphonyl-4-chlorotriazinyl-6, and 2,4-bis-(3'-carboxy-phenylsulphonyl-1')-triasinyl-6; pyrimidine rings containing sulphonyl groups, such as 2-carboxymethylsulphonyl-pyrimidinyl-4, 2-methylsulphonyl-6-methyl-pyrimidinyl-4, 2-methyl-sulphonyl-6-ethyl-pyrimidinyl-4, 2-phenylsulphonyl-5-chloro-6-methyl-pyrimidinyl-4, 2,6-bis-methylsulphonyl-pyrimidinyl-4, 2,6-bis-methylsulphonyl-5-chloro-pyrimidinyl-4, 2,4-bis-methylsulphonyl-pyrimidine-5-sulphonyl, 2-methylsulphonyl-pyrimidinyl-4, 2-phenylsulphonyl-pyrimidinyl-4, 2-trichloromethylsulphonyl-6- methyl-pyrimidinyl-4, 2-methylsulphonyl-5-chloro-6-methyl-pyrimidinyl-4, 2-methylsulphonyl-5-bromo-6-methyl-pyrimidinyl-4, 2-methylsulphonyl-5-chloro-6-ethylpyrimidinyl-4, 2-methylsulphonyl-5-chloro-6-chloromethyl-pyrimidinyl-4, 2-methylsulphonyl-4-chloro-6-methylpyrimidine-5-sulphonyl, 2-methylsulphonyl-5-nitro-6-methyl-pyrimidinyl-4, 2,5,6-tris-methylsulphonyl-pyrimidinyl-4, 2-methylsulphonyl-5,6-dimethyl-pyrimidinyl-4, 2-ethylsulphonyl-5-chloro-6-methylpyrimidinyl-4, 2-methylsulphonyl-6-chloropyrimidinyl-4, 2,6-bis-methylsulphonyl-5-chloropyrimidinyl-4, 2-methylsulphonyl-6-carboxy-pyrimidinyl-4, 2-methylsulphonyl-5-sulpho-pyrimidinyl-4, 2-methylsulphonyl-6-carbomethoxy-pyrimidinyl-4, 2-methylsulphonyl-5-carboxy-pyrimidinyl-4, 2-methylsulphonyl-5-cyano-6-methoxy-pyrimidinyl-4, 2-methylsulphonyl-5-chloropyrimidinyl-4, 2-sulphoethylsulphonyl-6-methyl-pyrimidinyl-4, 2-methylsulphonyl-5-bromo-pyrimidinyl-4, 2-phenylsulphonyl-5-chloro-pyrimidinyl-4, 2-carboxymethylsulphonyl-5-chloro-6-methyl-pyrimidinyl-4, 2-methylsulphonyl-6-chloropyrimidine-4 and -5-carbonyl, 2,6-bis-(methylsulphonyl)-pyrimidine-4 or -5-carbonyl, 2-ethylsulphonyl-6-chloropyrimidine-5-carbonyl, 2,4-bis-(methylsulphonyl)-pyrimidine-5-sulphonyl, 2-methylsulphonyl-4-chloro-6-methylpyrimidine-5-sulphonyl or -carbonyl; triazine rings containing ammonium groups, such as 2-trimethylammonium-4-phenylamino- or -4-(o-, m- or p-sulphophenyl)-aminotriazinyl-6, 2-(1,1-dimethylhydrazinium)-4-phenylamino- or -4-(o-, m- or p-sulphophenyl)-aminotriazinyl-6, 2-(isopropylidene-1,1-dimethyl)-hydrazinium-4-phenylamino- or -4-(o-, m- or p-sulphophenyl)-amino-triazinyl-6, 2-N-aminopyrrolidinium- or 2-N-aminopiperidinium-4-phenylamino- or -4-(o-, m- or p-sulphophenyl)-amino-triazinyl-6, and also 4-phenylamino- or 4-(sulphophenylamino)-triazinyl-6 radicals which in the 2-position contain, via a nitrogen bond, 1,4-bis-azabicyclo-[2,2,2]-octane or 1,2-bis-aza-bicyclo-[0,3,3]-octane bonded as a quaternary structure, 2-pyridinium-4-phenylamino- or -4-(o-, m- or p-sulphophenyl)-amino-triazinyl-6 and corresponding 2-oniumtriazinyl-6 radicals which are substituted in the 4-position by alkylamino, such as methylamino, ethylamino, or β-hydroxyethylamino or alkoxy, such as methoxy or alkoxy, or aroxy, such as phenoxy or sulphophenoxy, groups; 2-chlorobensthiasole-5- or -6-carbonyl or -5- or -6-sulphonyl, 2-arylsulphonyl- or -alkylsulphonylbenzthiazole-5- or -6-carbonyl or -5- or -6-sulphonyl, such as 2-methylsulphonyl- or 2-ethylsulphonylbenzthiazole-5- or -6-sulphonyl or -carbonyl, 2-phenylsulphonylbenzthiazole-5- or -6-sulphonyl or carbonyl and the corresponding 2-sulphonylbenzthiazole-5- or -6-carbonyl or -sulphonyl derivatives containing sulpho groups in the fused benzene ring, 2-chlorobenzoxazole-5- or -6-carbonyl or -sulphonyl, 2-chlorobenzimidazole-5- or -6-carbonyl or -sulphonyl, 2-chloro-1-methylbenzimidazole-5- or -6-carbonyl or -sulphonyl, 2-chloro-4-methylthiazole-(1,3)-5-carbonyl or -4- or -5-sulphonyl, and the N-oxide of 4-chloro- or 4-nitro-quinoline-5-carbonyl.

Further, there should be mentioned reactive groups of the aliphatic series, such as acryloyl, mono-, di- or trichloroacryloyl, such as —CO—CH=CH—Cl, —CO—CCl=CH$_2$, —CO—CCl=CH—CH$_3$ and also —CO—CCl=CH—COOH, —CO—CH=CCl—COOH, β-chloropropionyl, 3-phenylsulphonylpropionyl, 3-methylsulphonylpropionyl, 3-phenylsulphonylpropionyl, β-sulphato-ethylaminosulphonyl, vinylsulphonyl, β-chloroethylsulphonyl, β-sulphatoethylsulphonyl, β-methylsulphonyl-ethylsulphonyl, β-phenylsulphonylethylsulphonyl, 2-fluoro-2-chloro-3,3-difluorocyclobutane-1-carbonyl, 2,2,3,3-tetrafluorocyclobutanecarbonyl-1 or -sulphonyl-1, β-(2,2,3,3-tetrafluorocyclobutyl-1)-acryloyl, α- or β-bromoacryloyl, α- or β-alkyl- or -aryl-sulphonyl-acryloyl group, such as α- or β-methylsulphonyl-acryloyl.

W preferably represents a direct bond to a C atom of an aromatic-carbocyclic or aromatic-heterocyclic ring. Examples of suitable bridge members W are —CO—, —SO$_2$—,

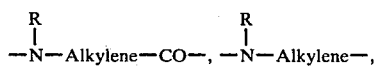

-continued

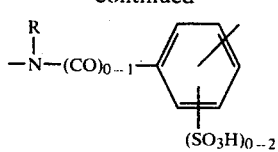

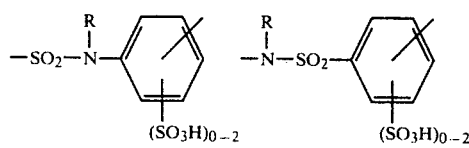

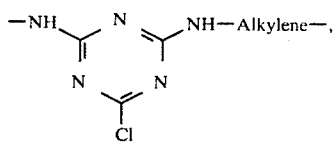

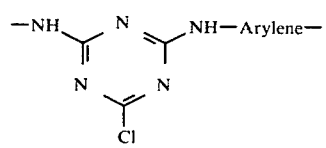

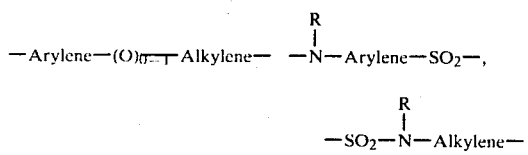

wherein
R preferably = H or $C_1$–$C_4$-alkyl;
Alkylene preferably denotes $C_2$–$C_5$-alkylene and
Arylene preferably denotes optionally substituted phenyl.

Preferred dyestuffs are those of the formula

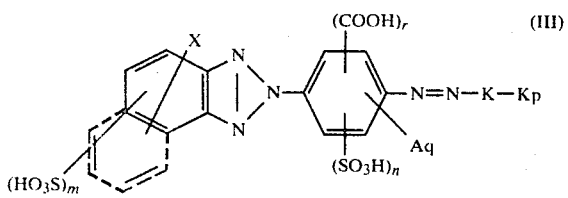

(III)

in which
m, n, r, p, q, A, K and X have the meaning indicated in the formula (I) and those of the formula

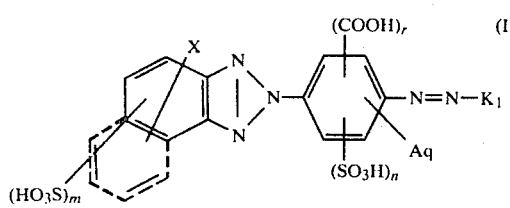

(IV)

in which
m, n, r, q, A and X have the meaning indicated in the formula (I) and
$K_1$ represents a coupling component of the benzene, naphthalene, pyrazolone, pyridone, pyrimidone, acetoacetic acid arylide or aminopyrazole series which does not possess a fibre-reactive radical, and also those of the formula

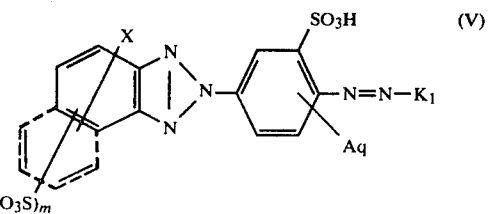

(V)

in which
m, q, A, X and $K_1$ have the meaning indicated in the formula (I)
as well as dyestuffs of the formula

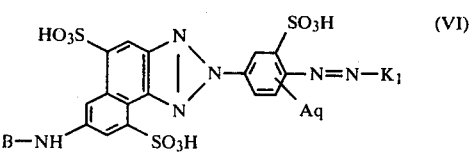

(VI)

in which
q, B, Q, A and $K_1$ have the meaning indicated in the formula (I),
especially dyestuffs of the formula (III) to (VI) in which K or $K_1$ denotes the radical of an enolic coupling component, preferably a coupling component of the pyrasolone, pyridone, pyrimidone, acetoacetic acid arylide or aminopyrazole series, and especially dyestuffs of the formula (III) to (VI) in which
K or $K_1$ denotes a radical of the formula

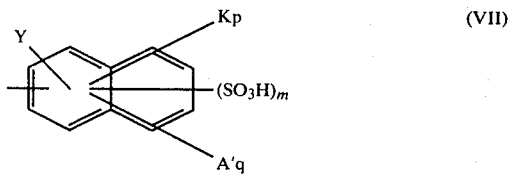

(VII)

in which
p, q, X and m have the abovementioned meaning,
Y represents a hydroxyl or amino group and
A' represents a non-ionic substituent, and in particular dyestuffs of the formula (IV) to (VI) in which
$K_1$ represents a radical of the formula

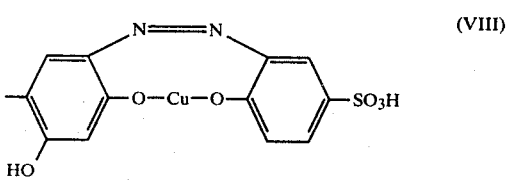

(VIII)

as well as those of the formula

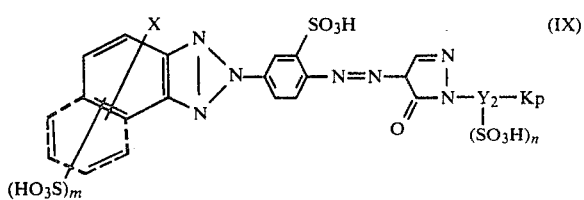

in which
  m, p and X have the abovementioned meaning,
  $Y_1$ represents a $C_1$–$C_4$-alkyl, carboxyl or carbalkoxy group with 1–4 C atoms in the alkoxy group, and
  $Y_2$ denotes an aromatic-carbocyclic radical, especially of the benzene or naphthalene series which optionally possesses further substituents which are non-ionic, and s=0, 1 or 2.

and also those of the formula

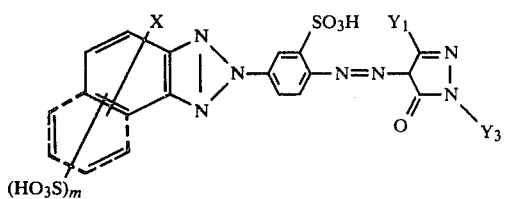

in which
  m, X and $Y_1$ have the abovementioned meaning and
  $Y_3$ represents hydrogen or a $C_1$–$C_4$-alkyl radical which can optionally be substituted by hydroxyl, halogen, nitrile, carboxyl, or carbalkoxy, as well as those of the formula

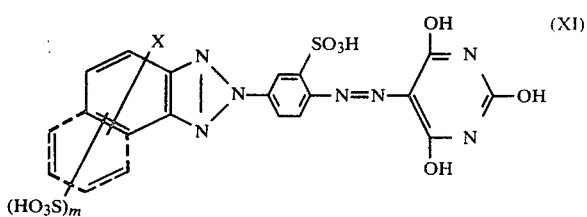

in which
  m and X have the abovementioned meaning as well as those of the formula

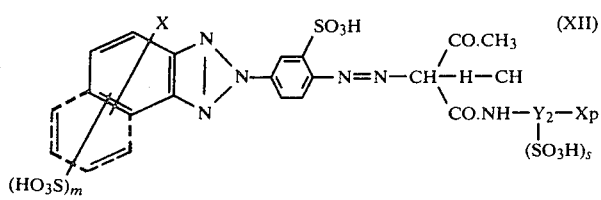

in which
  m, p, s, $Y_2$ and X have the abovementioned meaning as well as those of the formula

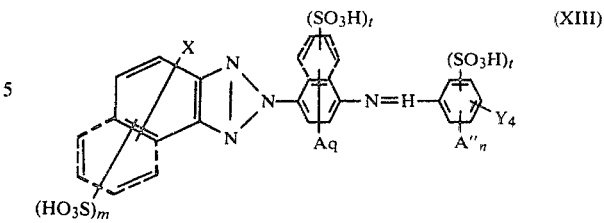

in which
  m, q, A and X have the abovementioned meaning,
  t is 0 or 1,
  n is 0, 1 or 2,
  A″ represents a non-ionic substituent and
  $Y_4$ represents an optionally alkylated hydroxyl group, an amino group which is optionally substituted by alkyl or acyl radicals, or the radical -NR-BQ,
wherein
  R, B and Q have the abovementioned meaning.

Examples of suitable non-ionic radicals A are halogen atoms such as F, Cl, or Br, nitrile groups, alkyl radicals with 1–4 C atoms such as —CH$_3$, —C$_2$H$_5$, n- and i—C$_3$H$_7$, n-, i- and t—C$_4$H$_9$ and alkoxy radicals with 1–3 C atoms, such as alkoxy, ethoxy, n- and i-propoxy, acylamino radicals, for example formylamino, C$_1$–C$_4$-alkylcarbonylamino such as acetylamino or propionylamino and OH.

Examples of suitable non-ionic radicals A' are alkoxy radicals with 1–3 C atoms such as methoxy, ethoxy, n- and i- propoxy, acylamino radicals such as, for example, forylamino, C$_1$–C$_4$-alkylcarbonylamino such as acetylamino and propionylamino, arylcarbonylamino groups, especially phenylcarbonyl-, tolylcarbonyl- or anisylcarbonyl-amino, C$_1$–C$_4$-alkylsulphonylamino groups, such as methyl-, ethyl- and propyl-sulphonylamino, arylsulphonylamino groups such as phenyl- and tolyl-sulphonylamino, carboxyl, carbonamide and sulphonamide groups which are optionally monosubstituted or disubstituted by C$_1$–C$_4$-alkyl radicals such as —CH$_3$, —C$_2$H$_5$, n- or i—C$_3$H$_7$ or by aryl radicals such as phenyl, chlorophenyl, tolyl or anisyl, C$_1$–C$_4$-alkylamino radicals such as, for example, —NH—CH$_3$, —N(CH$_3$)$_2$, —NH—C$_2$H$_5$, —NH—C$_3$H$_7$, and —N(C$_4$H$_3$)$_2$ and arylamino radicals, especially phenylamino radicals which are optionally substituted by chlorine, bromine, methyl and methoxy.

Possible non-ionic substituents A″ are in particular: halogen atoms such as Cl and F, alkyl and alkoxy radicals with 1–4 C atoms, cycloalkyl radicals, preferably the cyclohexyl radical, and aryl radicals which are optionally substituted by halogen, such as phenyl and chlorophenyl.

The radicals A-A″ can each be identical or different.
Examples of suitable radicals $Y_1$ and —CH$_3$, —C$_2$H$_5$, —COOH, —COOCH$_3$ and —COOC$_2$H$_5$.

$Y_2$ is preferably a phenyl radical which is substituted, for example by C$_1$–C$_4$-alkyl such as —CH$_3$, —C$_2$H$_5$, n- and i—C$_3$H$_7$, halogen such as Cl or Br, or C$_1$–C$_4$-alkoxy such as —OCH$_3$, —OC$_2$H$_5$ and —OC$_3$H$_7$.

Examples of suitable radicals $Y_3$ are hydrogen, alkyl, radicals with 1–4 C atoms such as —CH$_3$, —C$_2$H$_5$, n- and i—C$_3$H$_7$, and n-, i- and t—C$_4$H$_9$, and alkyl radicals with 1–4 C atoms which are substituted by hydroxyl, nitrile, carboxyl, or carbalkoxy groups, such as, for example, 2-hydroxyethyl, 2-hydroxypropyl, carboxy-methyl, carboethoxymethyl, and 2-chloro-, 2-bromo- and 2-cyano-ethyl and -propyl.

Suitable alkyl radicals for the hydroxyl group or amino group $Y_4$ are alkyl radicals with 1–7 C atoms which are optionally substituted by halogen, especially chlorine or bromine, hydroxyl, alkoxy, especially $C_1-C_4$-alkoxy, and nitrile radicals.

Examples of suitable acyl radicals are alkylcarbonyl radicals, especially $C_1-C_7$-alkylcarbonyl, and arylcarbonyl, especially optionally substituted phenylcarbonyl.

The dyestuffs of the general formula (I) are obtained by diazotising compounds of the formula

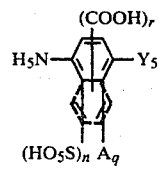  (XIV)

in which
n, r, q and A have the abovementioned meaning and $Y_5$ denotes a nitro or acylamino group and coupling the product with a compound of the formula

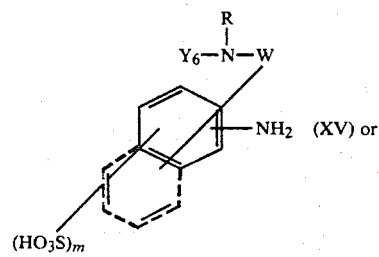  (XV) or

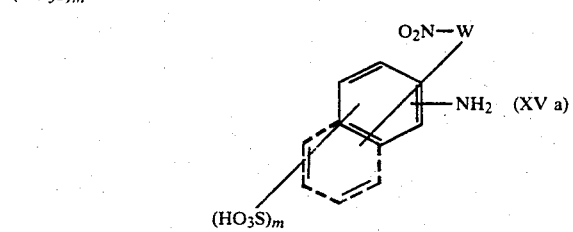  (XV a)

in which
m, W and R have the abovementioned meaning and $Y_6$ denotes hydrogen or an acyl group in the o-position to the amino group, and subsequently triazolysing. After the reduction of the nitro group, or saponification of the acylamino group, which may be required, the product is reacted with a reactive component of the formula

V-B-Q  (XVI)

wherein
B and Q have the above meaning and
V is a removable radical, preferably halogen. The amino compound of the formula

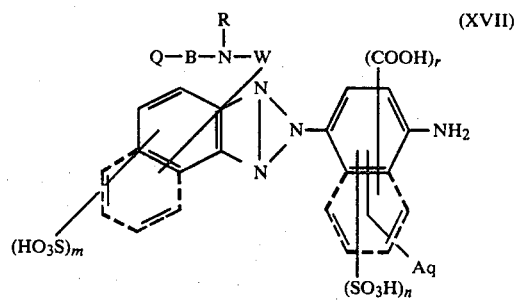  (XVII)

thus obtained is diazotised and reacted with a coupling component $H-K_1$, $H-K-W-N(R)-H$  (XVIII) or $H-K-W-N(R)-B-Q$  (XIX)

wherein
$K_1$, K, W, R, B and Q have the abovementioned meaning. Dyestuffs with a radical of the formula (XVIII) are subsequently reacted with a reactive component of the formula (XVI). This can result in two similar or two different fibre-reactive groupings in the dyestuff molecule. If a coupling component of the formula (XIX) is employed which already possesses a fibre-reactive grouping, two similar or two different reactive radicals can again result.

Of course, the reactive dyestuffs are also obtainable by reacting dyestuffs of the formula (XX)

in which
m, n, p, q, r, A, W and R have the abovementioned meaning with 1 or 2 mols of a reactive component of the formula (XVI). For example, products of the formula (XX) are obtained if a compound of the formula (XIV) in which $Y_5$ represents a nitro group is diazotised, coupled with a compound of the formula (XV), in which $Y_6$ represents an acyl group, and triazotised. After the reduction of the nitro group, the product is again diazotised and coupled with a component

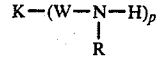  (XXI)

in which
K, W, R and p have the abovementioned meaning and thereafter the acyl group $Y_6$ is split off hydrolytically.

Dyestuffs of the general formula (IV) are also obtained if compounds of the formula (XIV) are diazotised and coupled with coupling components H-K₁ and thereafter the nitro group is reduced or the acylamino group is saponified. After diazotisation of the resulting aminoazo compound of the formula

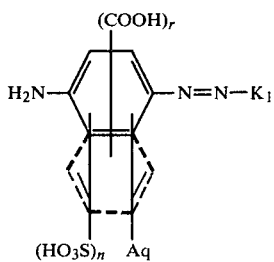

(XXII)

in which n, r, q, A and K₁ have the abovementioned meaning the product is coupled with compounds of the formula (XV) or (XV a) and triazolysed. After the reduction of the nitro group or saponification of the acylamino group which may be necessary, the dyestuffs obtained are treated with a reactive component of the formula (XVI).

Dyestuffs of the formula (XIII) in which $Y_4$ denotes an alkoxy group are obtained by diazotising compounds of the formula (XIV) in which $Y_5$ represents a nitro group, coupling with compounds of the formula (XV) in which $Y_6$ denotes an acyl group, and triazolysing. After reduction of the nitro group, the product is further diazotised and coupled with phenol or a phenol derivative and the hydroxyl group is alkylated in the usual manner. Thereafter the acyl group $Y_6$ is split off hydrolytically and the dyestuff is treated with the reactive component.

Dyestuffs of the formula (XIII) with $Y_4$=alkoxy are also obtained when aminoazo compounds of the formula

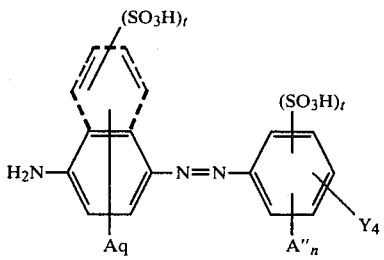

(XXIII)

in which q, t, n, A and A″ have the abovementioned meaning and $Y_4$ denotes an alkoxy group which is optionally substituted by halogen, hydroxyl, alkoxy or nitrile radicals, are diazotised, coupled with compounds of the formula (XV) or (XV a) and triazolysed. The reaction of the dyestuff with the reactive component is carried out subsequently, if necessary after splitting off the acyl group or reduction of the nitro group. Aminoaso compounds of the formula (XXIII) are obtained in the usual manner by diazotisation and coupling, using compounds of the formula

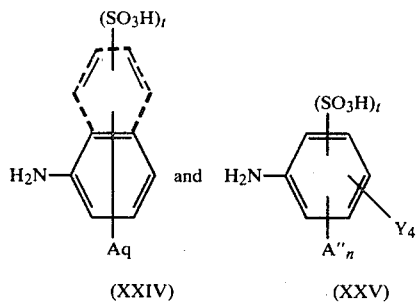

(XXIV) (XXV)

in which q, t, n, A, A″ and $Y_4$ have the meaning indicated in the formula (XXIII).

If appropriate, the N-methanesulphonic acid of the aniline of the formula (XXIV) is employed and the protective group is hydrolysed after coupling has taken place.

The following compounds may be mentioned as examples of starting materials for the manufacture of the new dyestuffs:

(a) Amino compounds of the formula (XIV)

4-Nitro-aniline, 2-chloro- and 3-chloro-4-nitro-aniline, 2,5-dichloro- and 2,6-dichloro-4-nitro-aniline, 4-nitro-2-methyl-aniline, 5-chloro-4-nitro-2-methyl-aniline, 2-cyano-4-nitro-aniline, 4-amino-acetanilide, 4-amino-oxanilic acid, 2,5-dichloro-4-amino-acetanilide, 2-amino-5-acetylaminotoluene, 4-nitro-aniline-2- and -3-sulphonic acid, 2-amino-5-oxalamino-benzene-1- and -2-sulphonic acid, 2-amino-5-formylamino-benzenesulphonic acid, 2-amino-5-acetylaminobenzenesulphonic acid, 5-nitro-2-amino-benzene-1- and -2-carboxylic acid, 2-amino-5-acetylamino-benzene-1- and -2-carboxylic acid, 4-nitro-1-naphthylamine-5-sulphonic acid, 4-nitro-1-naphthylamine-6-sulphonic acid and 1-amino-4-acetylamino-naphthalene-6- and -7-sulphonic acid.

(b) Amino compounds of the formula (XV) and (XV a)

1,3-Diamino-benzene, 4-chloro-1,3-diamino-benzene, 2,4-diaminotoluene, 2,6-diamino-toluene, 1,4-diamino-naphthalene, 2,7-diamino-naphthalene, 2,4-diamino-benzenesulphonic acid, 1,5-diamino-naphthalene-3,7-disulphonic acid, 1,6-diamino-naphthalene-4,8-disulphonic acid, 1,4-diamino-naphthalene-6-sulphonic acid, 1-amino-4-acetamino-naphthalene-6-sulphonic acid, 1-amino-4-acetamino-naphthalene-7-sulphonic acid, 1-amino-6-(4-nitrobenzoylamino)-naphthalene-4,8-disulphonic acid, 1-amino-4-(3-nitrobenzoylamino)-naphthalene-7-sulphonic acid, and 1-amino-4-(4-nitrobenzoylamino)-naphthalene-6-sulphonic acid.

(c) Coupling component K

3-Methyl-5-pyrazolone, 1-phenyl-3-methyl-5-pyrazolone, 1-(2-chlorophenyl)-3-methyl-5-pyrazolone, 1-(2,5-dichlorophenyl)-3-methyl-5-pyrazolone, 1-phenyl-3-methyl-5-pyrazolone-3-carboxylic acid and ethyl ester, 1-phenyl-3-methyl-5-pyrazolone-imide, 1-(2-chlorophenyl)-3-methyl-5-pyrazolone-imide, 1,o-tolyl-3-methyl-5-pyrazolone-imide, 1-(2-, 3-, 4-sulpho-phenyl)-3-methyl-5-pyrazolone, 1-(6-chloro-3-sulpho-phenyl)-3-methyl-5-pyrazolone, 1-(2,5-dichloro-4-sulpho-phenyl)-3-methyl-5-pyrazolone, 1-(4-sulpho-2-methyl-phenyl)-3-methyl-5-pyrazolone, 1-(6-chloro-4-sulpho-2-methyl-phenyl)-3-methyl-5-pyrazolone, 1-(4-sulpho-phenyl)-3- methyl-5-pyrazolone-imide, 1-(8-sulpho-2-naphthyl)-3-methyl-5-pyrazolone-imide, 1-[6-sulpho-2-naphthyl]-3-methyl-5-pyrazolone, 1-(4-sulphophenyl)-5-pyrazolone-3-carboxylic acid, 1-(6-chloro-4-sulpho-2-methyl-phenyl)-5-pyrazolone-3-carboxylic acid ethyl ester, 1-(4-amino-phenyl)-3-methyl-5-pyrazolone, 1-(3-amino-phenyl)-3-methyl-5-pyrazolone, 1-(3-amino-5-sulpho-2-methyl-phenyl)-3-methyl-5-pyrazolone, 1-(4-amino-phenyl)-5-pyrazolone-3-carboxylic acid, 1-(3-amino-phenyl)-5-pyrazolone-3-carboxylic acid, 1-[3-(3-nitro-benzoyl-amino)-phenyl]-5-pyrazolone-3-carboxylic acid, 1-carboxymethyl-3-methyl-5-pyrazolone, 1-(2-cyano-ethyl)-3-methyl-5-pyrazolone, 1-(2-chloroethyl)-3-methyl-5-pyrazolone, 1-methyl-, -ethyl- and -propyl-3-methyl-5-pyrazolone, 1-methyl-2-hydroxy-4-methyl-5-cyano-6-pyridone, 1-phenyl-2-hydroxy-4-methyl-5-cyano-6-pyridone, 2,4,6-trihydroxy-pyrimidine, 2-methyl-4,6-dihydroxy-pyrimidine, 2-phenyl-4-amino-6-hydroxy-pyrimidine, 2-phenyl-4,6-dihydroxy-pyrimidine, acetoacetic acid anilide, o-, m- and p-anisidide and o-, m- and p-toluidide, acetoacetic acid p-chloro-anilide, acetoacetic acid 4-chloro-2-methyl-anilide, acetoacetic acid 2,4- or 2,5- or 2,6-dimethyl-anilide, acetoacetic acid 4-sulpho-anilide, acetoacetic acid 2-methoxy-4-sulpho-5-methyl-anilide, acetoacetic acid 2,4-, 2,5- or 3,5-disul-pho-anilide, acetoacetic acid-(2,5-disulpho-4-acetylaminoanilide), acetoacetic acid-(2- or 3-sulpho-4-ethoxy-anilide) and acetoacetic acid-(3-sulpho-4-methyl-anilide).

1-Naphthol-3-, -4- and -5-sulphonic acid, 2-naphthol-4-, -5-, -6- and -7-sulphonic acid, 6-amino-1-naphthol-3-sulphonic acid, 6-acetylamino-1-naphthol-3-sulphonic acid, 6-benzoylamino-1-naphthol-3-sulphonic acid, 7-amino-1-naphthol-3-sulphonic acid, 7-dimethylamino-1-naphthol-3-sulphonic acid, 7-anilino-1-naphthol-3-sulphonic acid, 7-acetylamino-1-naphthol-3-sulphonic acid, 7-benzoylamino-1-naphthol-3-sulphonic acid, 8-acetylamino-1-naphthol-5-sulphonic acid, 8-acetylamino-2-naphthol-5- or -6-sulphonic acid, 6-(4-aminobenzoylamino)-1-naphthol-3-sulphonic acid, 7-(2-aminoethylamino)-1-naphthol-3-sulphonic acid, 8-acetylamino- and benzoylamino-1-naphthol-3,5-disulphonic acid, 7-acetylamino-1-naphthol-3,6-disulphonic acid, 8-amino-, -acetylamino-, -benzoylamino- and benzenesulphonylamino-1-naphthol-3,6-disulphonic acid, 1-naphthol-3,6-, -3,7-, -3,8-, -4,8- and -5,7-disulphonic acid, 2-naphthol-3,6-, -3,7-, -4,8-, -5,7-, and -6,8-disulphonic acid, 1-naphthylamine-2- to -8-sulphonic acid, 2-naphthylamine-1- and -5- to -8-sulphonic acid, 1-naphthylamine-5,7-, -4,8-, -3,8-, -4,6-, -3,7-, and -3,6-disulphonic acid, 2-naphthylamine-5,7-, -4,7-, -3,7-, and -3,6-disulphonic acid, 1-amino-naphthalene, 1- and 2-hydroxy-naphthalene, 8-acetamino-2-hydroxy-naphthalene, 8-methanesulphonylamino-2-hydroxy-naphthalene, 1-hydroxy-naphthalene-4-sulphonamide, 2-hydroxy-3-naphthoic acid, amide, anilide, chloroanilide and toluidide.

Phenol, 2-, 3- and 4-methyl-phenol, 1-hydroxybenzene-2-carboxylic acid ethyl ester, 2-, 3- or 4-chloro-phenol, 2-methyl-3-, -5- or -6-chlorophenol, 3-methyl-6-chlorophenol, 2-ethyl-phenol, 2,3- or 2,5- or 2,6- or 3,5-dichlorophenol, 2,6-diethylphenol, 2-cyclohexyl-phenol, 2-methoxy-phenol, or ethoxy-phenol, 3-methoxy-phenol, 3-acetylaminophenol, 4-hydroxy-diphenyl, 4-cyclohexyl-phenol, 4-t-butyl-phenol, aniline, 2- or 3-methyl-aniline, 2,3-, 2,5- and 2,6-dimethylaniline, N-methyl- or N,N-dimethyl-aniline, N-ethyl- or N,N-diethylaniline, N,N-dipropyl-aniline, N-(2-chloroethyl)-N-butyl-aniline, N-methyl-N-(2-hydroxy-ethyl)-aniline, N,N-bis-(2-hydroxyethyl)-aniline, N-methyl-N-(2-cyano-ethyl)-aniline, N,N-diethyl-2- or -3-methyl-aniline, N,N-(bis-2-hydroxy-ethyl)-3-methylaniline, N,N-diethyl-3-acetaminoaniline, N,N-(bis-2-hydroxy-ethyl)-3-acetamino-aniline, N,N-diethyl-3-ethoxy-aniline, N,N-(bis-2-hydroxy-ethyl)-2-methoxy-5-methyl-aniline, N,N-(bis-2-acetoxy-ethyl)-3-acetamino-aniline and phenol-2- and -3-sulphonic acid.

(d) Amino compounds of the formula (XXV)

4-Amino-anisole-2-sulphonic acid, 4-amino-phenetole-2-sulphonic acid, 4-amino-anisole-3-sulphonic acid, 4-aminophenetole-3-sulphonic acid, 2-amino-anisole-4-sulphonic acid, 2-aminoanisole-4-sulphonic acid amide, 2-amino-1-methoxybenzene, 2-amino-1-ethoxy-benzene, 4-chloro-2-amino-anisole, 5-chloro-4-amino-anisole, 4,5-dichloro-2-amino-anisole, 3-amino-1-methoxy-benzene, 4-amino-1-methoxy-benzene, 4-amino-1-ethoxy-benzene and 2-chloro-4-amino-anisole.

(e) Amino compounds of the formula (XXIV)

Aniline, 2- and 3-methyl-aniline, 2- and 3-ethylaniline, 2,3-, 2,5- and 2,6-dimethyl-aniline, 2- and 3-methoxy-aniline, 2- and 3-ethoxy-aniline, 2-amino-4-methoxytoluene, 3-amino-4-methoxy-toluene, 3-amino-4-ethoxy-toluene, 2,5-dimethoxy-aniline, 3-acetamino-aniline, 1-amino-naphthalene-6- and -7-sulphonic acid and 1-amino-2-ethoxy-naphthalene-6- and -7-sulphonic acid.

Suitable alkylating agents for etherifying the phenolic OH groups in the new dyestuffs are: alkyl halides, alkyl-sulphonates, halogenohydrins, alkylene cyanides and alkylene oxides.

The following may be mentioned individually: ethyl chloride, ethyl bromide, methyl iodide, dimethylsulphate or diethylsulphate, benzyl chloride, ethylene oxide, propylene oxide, acrylonitrile, 2-chloroethanol and 3-chloro-1-propanol.

Suitable acylating agents for the free amino group are acid halides and acid anhydrides such as acetic anhydride, acetyl chloride, propionyl chloride and benzoyl chloride.

Examples of suitable reactive components (XVI) are: trihalogeno-sym.-triazines, such as cyanuric chloride and cyanuric bromide, halogeno-monoamino- and -mono-substituted amino-sym.-triazines, such as 2,6-dichloro-4-aminotriazine, 2,6-dichloro-4-methylaminotriazine, 2,6-dichloro-4-ethylaminotriazine, 2,6-dichloro-4-hydroxyethylaminotriazine, 2,6-dichloro-4-phenylaminotriazine, 2,6-dichloro-4-(o-, m- or p-sulpho-phenyl)-aminotriazine, 2,6-dichloro-4-(2',5'-, -2',4'- or -3',5'-disulphophenyl)-aminotriazine, dihalogeno-alkoxy- and -aryloxy-sym.-triazines, such as 2,6-dichloro-4-methoxytriazine, 2,6-dichloro-4-ethoxytriazine, 2,6-dichloro-4-phenoxytriazine, 2,6-dichloro-4-(o-, m- or p-sulphophenyl)-hydroxytriazine, dihalogeno-alkylmercapto- and -arylmercapto-sym.-triazines, such as 2,6-dichloro-4-ethylmercaptotriazine, 2,6-dichloro-4-phenylmercapto-triazine, 2,6-dichloro-4-(p-methyl-phenyl)-mercaptotriazine; tetrahalogenopyrimidines, such as tetrachloro-, tetrabromo- or tetrafluoro-pyrimidine, 2,4,6-trihalogeno-pyrimidines, such as 2,4,6-tri-chloro-, -tribromo- or -trifluoro-pyrimidine, dihalogenopyrimidines, such as 2,4-dichloro-, -dibromo- or -difluoro-pyrimidine; 2,4,6-trichloro-5-nitro- or -5-methyl- or -5-carbomethoxy- or -5-carboethoxy- or -5-carboxymethyl- or -5-mono-, -di- or -trichloromethyl- or -5-carboxy- or -5-sulpho- or -5-cyano- or -5-vinyl-pyrimidine, 2,4-difluoro-6-methylpyrimidine, 2,6-difluoro-4-methyl-5-chloropyrimidine, 2,4-difluoro-pyrimidine-5-ethylsulphone, 2,6-difluoro-4-chloropyrimidine, 2,4,6-trifluoro-5-chloro-pyrimidine, 2,6-difluoro-4-methyl-5-bromopyrimidine, 2,4-difluoro-5,6-dichloro- or -dibromopyrimidine, 4,6-difluoro-4,5-dichloro- or -dibromopyrimidine, 2,6-difluoro-4-bromopyrimidine, 2,4,6-trifluoro-5-bromopyrimidine, 2,4,6-trifluoro-5-chloromethylpyrimidine, 2,4,6-trifluoro-5-nitropyrimidine, 2,4,6-trifluoro-5-cyanopyrimidine, 2,4,6-trifluoro-pyrimidine-5-carboxylic acid alkyl esters or -5-carboxylic acid amides, 2,6-difluoro-5-methyl-4-chloro-pyrimidine, 2,6-difluoro-5-chloropyrimidine, 2,4,6-trifluoro-5-methylpyrimidine, 2,4,5-trifluoro-6-methylpyrimidine, 2,4-difluoro-5-nitro-6-chloropyrimidine, 2,4-difluoro-5-cyanopyrimidine, 2,4-difluoro-5-methylpyrimidine, 6-trifluoromethyl-5-chloro-2,4-difluoro-pyrimidine, 6-phenyl-2,4-difluoropyrimidine, 6-trifluoromethyl-2,4-difluoropyrimidine, 6-trifluoromethyl-2,4-difluoropyrimidine, 5-trifluoromethyl-2,4,6-trifluoropyrimidine, 2,4-difluoro-5-nitro-pyrimidine, 2,4-difluoro-5-trifluoromethyl-pyrimidine, 2,4-difluoro-5-methylsulphonyl-pyrimidine, 2,4-difluoro-5-phenyl-pyrimidine, 2,4-difluoro-5-carbonamido-pyrimidine, 2,4-difluoro-5-carbomethoxy-pyrimidine, 2,4-difluoro-6-trifluoromethyl-pyrimidine, 2,4-difluoro-5-bromo-6-trifluoromethylpyrimidine, 2,4-difluoro-6-carbonamido-pyrimidine, 2,4-difluoro-6-carbonamido-pyrimidine, 2,4-difluoro-6-carbomethoxypyrimidine, 2,4-difluoro-6-phenyl-pyrimidine, 2,4-difluoro-6-cyanopyrimidine, 2,4,6-trifluoro-5-methylsulphonyl-pyrimidine, 2,4-difluoro-5-sulphonamido-pyrimidine, 2,4-difluoro-5-chloro-6-carbomethoxy-pyrimidine, 5-trifluoromethyl-2,4-difluoropyrimidine, 2,4-dichloropyrimidine-5-carboxylic acid chloride, 2,4,6-trichloropyrimidine-5-carboxylic acid chloride, 2-methyl-4-chloropyrimidine-5-carboxylic acid chloride, 2-chloro-4-methylpyrimidine-5-carboxylic acid chloride, and 2,6-dichloropyrimidine-4-carboxylic acid chloride; pyrimidine reactive components with removable sulphonyl groups, such as 2-carboxymethylsulphonyl-4-chloropyrimidine, 2-methylsulphonyl-4-chloro-6-methylpyrimidine, 2,4-bis-methylsulphonyl-6-methylpyrimidine, 2,4-bis-phenylsulphonyl-5-chloro-6-methylpyrimidine, 2,4,6-tris-methylsulphonylpyrimidine, 2,6-bis-methylsulphonyl-4,5-dichloride-pyrimidine, 2,4-bis-methylsulphonylpyrimidine-5-sulphonic acid chloride, 2-methyl-sulphonyl-4-chloropyrimidine, 2-phenylsulphonyl-4-chloropyrimidine, 2,4-bis-trichloromethylsulphonyl-6-methylpyrimidine, 2,4-bis-methylsulphonyl-5-chloro-6-methylpyrimidine, 2,4-bis-methylsulphonyl-5-bromo-6-methylpyrimidine, 2-methylsulphonyl-4,5-dichloro-6-methylpyrimidine, 2-methylsulphonyl-4,5-dichloro-6-chloromethylpyrimidine, 2-methylsulphonyl-4-chloro-6-methylpyrimidine-5-sulphonic acid chloride, 2-methylsulphonyl-4-chloro-5-nitro-6-methylpyrimidine, 2,4,5,6-tetramethylsulphonyl-pyrimidine, 2-methylsulphonyl-4-chloro-5,6-dimethylpyrimidine, 2-ethylsulphonyl-4,5-dichloro-6-methylpyrimidine, 2-methylsulphonyl-4,6-dichloropyrimidine, 2,4,6-trimethylsulphonyl-5-chloropyrimidine, 2-methylsulphonyl-4-chloro-6-carboxypyrimidine, 2-methylsulphonyl-4-chloropyrimidine-5-sulphonic acid, 2-methylsulphonyl-4-chloro-6-carbomethoxy-pyrimidine, 2-methylsulphonyl-4-chloropyrimidine-5-carboxylic acid, 2-methylsulphonyl-4-chloro-5-cyano-6-methoxypyrimidine, 2-methylsulphonyl-4,5-dichloropyrimidine, 4-methylsulphonyl-6-chloropyrimidine, 2-sulphoethylsulphonyl-4-chloro-6-methylpyrimidine, 2-methylsulphonyl-4-chloro-5-bromopyrimidine, 2-methylsulphonyl-4-chloro-5-bromo-6-methylpyrimidine, 2,4-bis-methylsulphonyl-5-chloropyrimidine, 2-phenylsulphonyl-4,5-dichloropyrimidine, 2-phenyl-sulphonyl-4,5-dichloro-6-methylpyrimidine, 2-carboxy-methylsulphonyl-4,5-dichloro-6-methylpyrimidine, 2-(2'- or 3'- or 4'-carboxy-phenylsulphonyl)-4,5-dichloro-6-methylpyrimidine and 2,4-bis-(2'- or 3'- or 4'-carboxyphenylsulphonyl)-5-chloro-6-methylpyrimidine; 2-methylsulphonyl-6-chloropyrimidine-4- or -5-carboxylic acid chloride, 2-ethylsulphonyl-6-chloropyrimidine-4- or -5-carboxylic acid chloride, 2,6-bis-(methylsulphonyl)-pyrimidine-4-carboxylic acid chloride, 2-methylsulphonyl-6-methyl-4-chloro- or -4-bromopyridine-5-carboxylic acid chloride or bromide, and 2,6-bis-(methylsulphonyl)-4-chloropyrimidine-5-carboxylic acid chloride; examples of further reactive components of the heterocyclic series which possess reactive sulphonyl substituents are 3,6-bis-phenylsulphonyl-pyridazine, 3-methylsulphonyl-6-chloropyridazine, 3,6-bis-trichloromethylsulphonylpyridazine, 3,6-bis-methylsulphonyl-4-methylpyridazine, 2,5,6-tris-methylsulphonylpyrazine, 2,4-bis-methylsulphonyl-1,3,5-triazine, 2,4-bis-methylsulphonyl-6-(3'-sulphophenylamino)-1,3,5-triazine, 2,4-bis-methylsulphonyl-6-N-methylanilino-1,3,5-triazine, 2,4-bismethylsulphonyl-6-trichloroethoxy-1,3,5-triazine, 2,4,6-tris-phenylsulphonyl-1,3,5-triazine, 2,4-bis-methylsulphonylquinazoline, 2,4-bistrichloromethylsulphonylquinoline, 2,4-bis-carboxy-methylsulphonylquinoline, 2,6-bis-(methylsulphonyl)-pyridine-4-carboxylic acid chloride and 1-(4'-chlorocarbonylphenyl or 2'-chlorocarbonylethyl)-4,5-bis-methyl-sulphonyl-6-pyridazone; 2,4-bis-methylsulphonyl-6-phenoxy-1,3,3-triazine. Further heterocyclic reactive components with mobile halogen are, inter alia, 2- or 3-monochloroquinoxaline-6-carboxylic acid chloride, or -6-sulphonic acid chloride, 2- or 3-monobromoquinazoline-6-carboxylic acid bromide or -6-sulphonic acid bromide, 2,3-dichloroquinoxaline-6-carboxylic acid chloride or -6-sulphonic acid chloride, 2,3-dibromoquinoxaline-6-carboxylic acid bromide or -6-sulphonic acid bromide, 1,4-dichlorophthalazine-6-carboxylic acid chloride or -6-sulphonic acid chloride, as well as the corresponding bromine compounds, 2,4-dichloroquinazein-6- or -7-carboxylic acid chloride as well as the corresponding bromine compounds, 2- or 3- or 4-(4',5'-dichloropyridazon-6'-yl-1')-phenylsulphonic acid chloride or -carboxylic acid chloride as well as the corresponding bromine compounds, β-(4',5'-dichloropyridazon-6'-yl-1')-ethylcarboxylic acid chloride, 2-chloroquinoxaline-3-carboxylic acid chloride and the corresponding bromine compound, N-methyl-N-(2,4-dichlorotriazinyl-6)-carbamic acid chloride, N-methyl-N-(2-chloro-4-methylamino-triazinyl-6)-carbamic acid chloride, N-methyl-N-(2-chloro-4-dimethylaminotriazinyl-6)-carbamic acid chloride, N-methyl- or N-ethyl-N-(2,4-dichlorotriazinyl-6)-amino-acetyl chloride, N-methyl-, N-ethyl- or N-hydroxyethyl-N-(2,3-dichloroquinoxaline-6-sulphonyl- or -6-carbonyl)-aminoacetyl chlorides and the corresponding bromine derivatives, and also 2-chlorobenzthiazole-5- or -6-carboxylic acid chloride or -5- or -6-sulphonic acid chloride and the corresponding bromine compounds, 2-arylsulphonyl- or 2-alkylsulphonyl-benzthiazole-5- or -6-carboxylic acid chloride or -5- or -6-sulphonic acid chloride, such as 2-methylsulphonyl- or 2-ethylsulphonyl- or 2-phenylsulphonyl-besthiazole-5- or -6-sulphonic acid chloride or -5- or -6-carboxylic acid chloride as well as the corresponding 2-sulphonyl-benzthiazole derivatives containing sulphonic acid groups in the fused benzene ring, 3,5-bis-methylsulphonyl-isothiazole-4-carboxylic acid chloride, 2-chlorobenzoxazole-5- or -6-carboxylic acid chloride or -sulphonic acid chloride as well as the corresponding bromine derivatives, 2-chlorobenzimidazole-5- or -6-carboxylic acid chloride or -sulphonic acid chloride as well as the corresponding bromine derivatives, 2-chloro-1-methyl-benzimidazole-5- or -6-carboxylic acid chloride or -sulphonic acid chloride as well as the corresponding bromine derivatives, 2-chloro-4-methyl-1,3-thiazole-5-carboxylic acid chloride or -4- or -5-sulphonic acid chloride, 2-chlorothiazole-4- or -5-sulphonic acid chloride and the corresponding bromine derivatives.

As examples from the series of the aliphatic reactive components there may be mentioned: acrylic acid chloride, mono-, di- or tri-chloroacrylic acid chloride, 3-chloropropionic acid chloride, 3-phenylsulphonyl-propionic acid chloride, 3-methylsulphonyl-propionic acid chloride, 3-ethylsulphonyl-propionic acid chloride, 2-chloroethanesulphochloride, chloromethanesulphochloride, 2-chloroacetyl chloride, 2,2,3,3-tetrafluorocyclobutane-1-carboxylic acid chloride, β-(2,2,3,3-tetrafluorocyclobutyl-1)-acrylic acid chloride, β-(2,3,3-trifluoro-2-chloro-cyclobutane-1)-carboxylic acid chloride, β-methyl-sulphonyl-acrylic acid chloride, a-methylsulphonyl-acrylic acid chloride and a-bromoacrylic acid chloride and β-bromoacrylic acid chloride.

The new dyestuffs are particularly suitable for dyeing and printing natural and regenerated cellulose fibre materials such as cotton and rayon, as well as natural and synthetic polyamide fibre materials, for example those of wool, silk, poly-ε-carprolactam or the polycondensate of hexamethylenediamine and adipic acid. The dyeings obtained, especially those on cotton and rayon, are distinguished by good fastness properties, especially fastness to wet processing and to light.

EXAMPLE 1

26.0 g (0.1 mol) of 1-amino-4-oxalylamino-benzenesulphonic acid in aqueous solution are treated at pH=7 with 69 g of sodium nitrite and indirectly diazotised in the usual manner by allowing the solution to run into 28 ml of hydrochloric acid (28% strength). The finished diazotisation mixture is added to an aqueous suspension of 33.3 g (0.105 mol) of 1,6-diaminonaphthalene-4,8-disulphonic acid and the mixture is buffered to pH=4 with 20% strength sodium acetate solution. After completion of the reaction, the mixture is neutralised with sodium hydroxide solution, treated with 90 ml of concentrated ammonia and heated to 80°-90°. 56 g (0.22 mol) of copper sulphate are then sprinkled in to triazolyse the product and the temperature is maintained until the solution is colourless. To split off the oxalyl radical and precipitate copper oxide, sodium hydroxide (4% of the total volume) is added and the mixture is boiled for a further two hours. It is then filtered and the filtrate is rendered acid to Congo Red, whereupon the triazole of the formula (1) precipitates. (Yield approx. 0.08 mo; 80%).

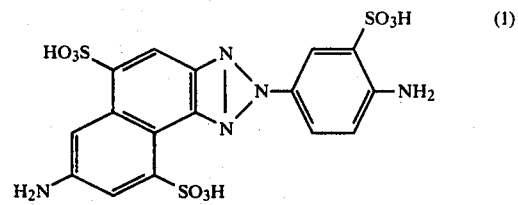

The product is dissolved in 700 ml of water at pH=5 and 11 ml of 2,4,6-trifluoro-5-chloro-pyrimidine are added dropwise at room temperature. The pH is kept constant by adding sodium carbonate. After completion of the reaction, 6 g of sodium nitrite are added and the mixture is allowed to run into 30 ml of hydrochloric acid (28% strength). After reacting for a further hour, any excess nitrous acid is destroyed with amidosulphonic acid, 17.6 g (0.086 mol) of 1-phenyl-3-carboxy-5-pyrazolone are sprinkled in and the mixture is buffered with sodium acetate at pH=5. After the end of the reaction, the product is filtered off and dried in vacuo at 40°. The resulting dyestuff, as the free acid, has the formula:

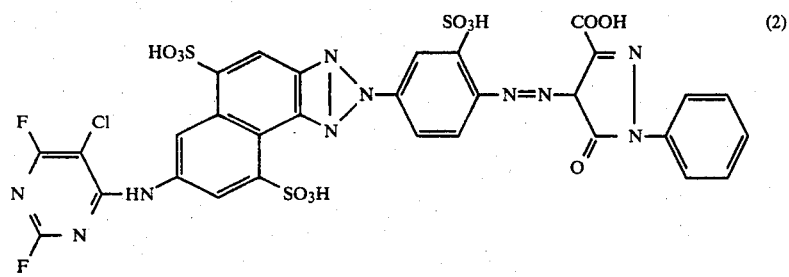

It is an orange-coloured powder which dissolves in water to give a yellow colour and dyes cotton in golden yellow shades.

The dyestuffs listed in Table I below are obtained analogously to Example 1 if the compound of the formula 1 is diazotised after treatment with the reactive component, and reacted with a coupling component.

The dyestuffs display the indicated colour shades and dye cotton in these colour shades.

TABLE I

| Diazo Component | Coupling Component | Colour Shade |
|---|---|---|
| 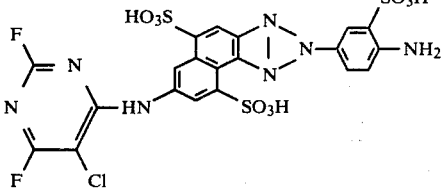 | 3-Methyl-5-pyrazolone | yellow |
| " | 1-Phenyl-3-methyl-5-pyrazolone | yellow |
| " | 1-Phenyl-5-pyrazolone-3-carboxylic acid ethyl ester | yellow |
| " | 1-(2-Chloro-phenyl)-3-methyl-5-pyrazolone | yellow |
| " | 1-(2,5-Dichlorophenyl)-3-methyl-5-pyrazolone | yellow |
| " | 1-(2-Methyl-phenyl)-3-methyl-5-pyrazolone | yellow |
| " | 1,3-Dimethyl-5-pyrazolone | yellow |
| " | 1-Carboxy-methyl-3-methyl-5-pyrazolone | yellow |
| " | 1-(2-Carboxy-ethyl)-3-methyl-5-pyrazolone | yellow |
| " | 1-(2-Carboxy-ethyl)-3-carboxy-5-pyrazolone | yellow |
| " | 1-(4-Sulpho-phenyl)-3-methyl-5-pyrazolone | yellow |
| " | 1-(2-Methyl-4-sulpho-phenyl)-3-methyl-5-pyrazolone | yellow |
| " | 1-(4-Sulpho-phenyl)-5-pyrazolone-3-carboxylic acid | yellow |
| " | 1-(2,5-Dichloro-4-sulpho-phenyl)-methyl-5-pyrazolone | yellow |
| " | 1-(2-Sulpho-phenyl)-3-methyl-5-pyrazolone | yellow |
| " | 1-(3-Sulphamoyl-phenyl)-3-methyl-5-pyrazolone | yellow |
| " | 1-(6-Chloro-3-sulpho-phenyl)-3-methyl-5-pyrazolone | yellow |
| " | 1-(2-Chloro-4-sulpho-phenyl)-3-methyl-5-pyrazolone | yellow |
| " | 1-(6-Chloro-4-sulpho-2-methyl-phenyl)-3-methyl-5-pyrazolone | yellow |
| " | 1-[6-Sulpho-2-naphthyl]-3-methyl-5-pyrazolone | yellow |
| " | 1-Phenyl-3-methyl-5-amino-pyrazole | yellow |
| " | 1-(3-Sulpho-phenyl)-3-methyl-5-amino-pyrazole | yellow |
| " | Barbituric acid | yellow |
| " | Acetoacetic acid o-anisidide | yellow |
| " | Acetoacetic acid o-toluidide | yellow |
| " | 1-(3-Carboxy-phenyl)-3-methyl-5-pyrazolone | yellow |
| " | 2,4-Dimethyl-2-hydroxy-5-cyano-6-pyridone | yellow |
| " | 1-Phenyl-2-hydroxy-4-methyl-5-cyano-6-pyridone | yellow |
| " | 2-Hydroxy-6-pyridone | yellow |
| " | 2-Hydroxy-4-carboxy-6-pyridone | yellow |
| " | 2-Hydroxy-naphthalene-6,8-disulphonic acid | scarlet |
| " | 2-Hydroxy-naphthalene-3,6-disulphonic acid | scarlet |
| " | 1-Hydroxy-naphthalene-4-sulphonic acid | red |
| " | 8-Benzoylamino-1-naphthol-3,6-disulphonic acid | red |
| " | 4-Acetylamino-1-naphthol-3,5-disulphonic acid | red |
| " | 1-Naphthylamine-4,8-disulphonic acid | red |
| " | 1-Naphthylamine-4-sulphonic acid | red |
| " | 2-Naphthylamine-3,6-di- | scarlet |

TABLE I-continued

| Diazo Component | Coupling Component | Colour Shade |
|---|---|---|
| | sulphonic acid | |
| " | 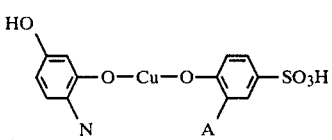 | brown |
| " | 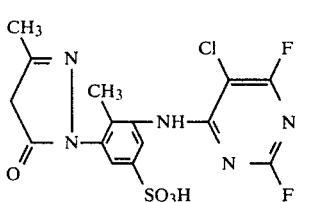 | yellow |
| " | 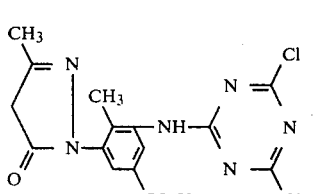 | yellow |
| " | 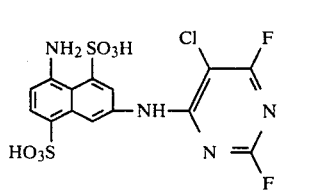 | claret |

If the cold solution of the triazole compound of the formula 1 is reacted with 15.5 g of cyanuric chloride which has been dissolved in 80 ml of acetone and subsequently been introduced into ice water, keeping the pH constant at 6 by adding sodium carbonate, the diazo component of the formula

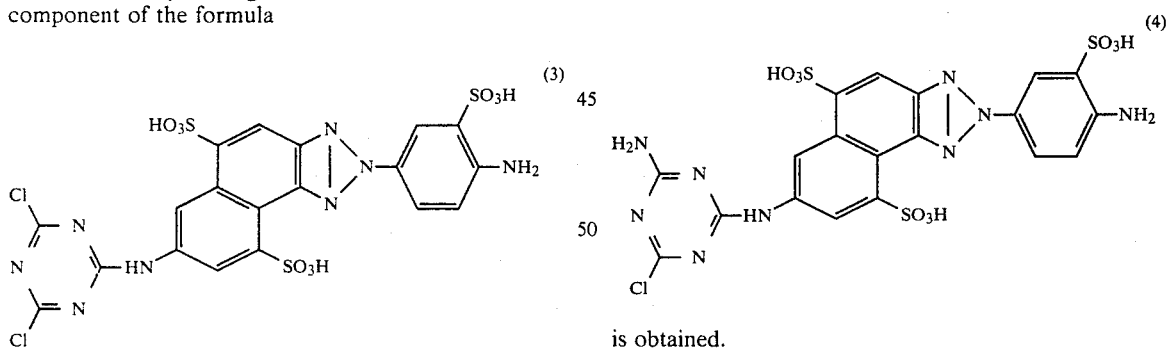

can be obtained.

This is diazotised analogously to Example 1. Using the coupling components indicated in Table I the corresponding reactive dyestuffs are obtained.

If the solution of the compound of the formula (3) is treated with 50 ml of a 10% strength ammonia solution at 30°–40° (2 hours), the diazo component of the formula is obtained.

This is isolated after acidification with hydrochloric acid and is subsequently dissolved in 700 ml of water under neutral conditions and diazotised analogously to Example 1. Using the coupling components indicated in Table I, the corresponding reactive dyestuffs are obtained.

If instead of ammonia 1-amino-benzene-3,5-disulphonic acid is used at pH=5 (40°), the diazo component of the formula

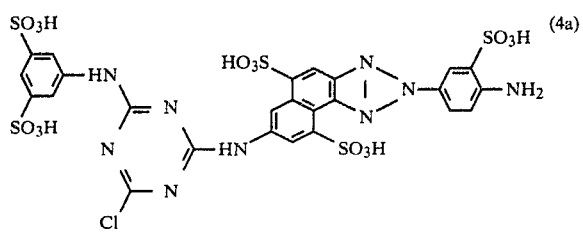

is obtained. Using this, diazotisation and reaction with the coupling components indicated in Table I yields the corresponding reactive dyestuffs.

If the compound of the formula (1) is reacted with 26 g of 2,3-dichloro-quinoxaline-6-carboxylic acid chloride at 35°–40° and pH=6, the acid chloride being kept in suspension, the diazo component of the formula

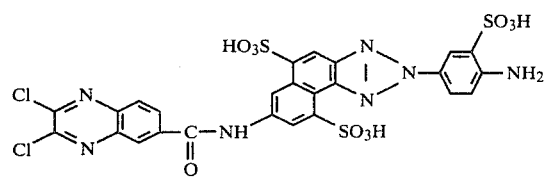

is obtained. This is diazotised analogously to Example 1 and yields the corresponding dyestuffs with the coupling components indicated in Table I.

If the solution of the triazole compound of the formula 1 is reacted with 19.3 g of 2-methylsulphonyl-4,5-dichloro-6-methyl-pyrimidine at 60°–65°, the hydrochloric acid liberated being neutralised by adding sodium carbonate, the diazo component of the formula

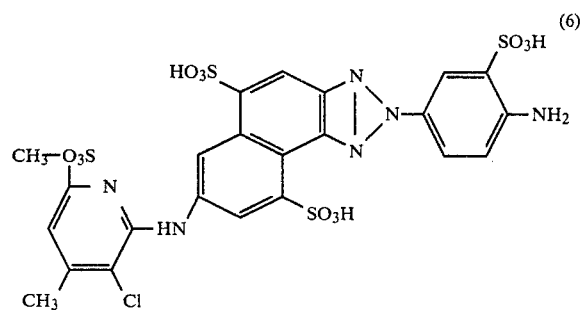

is obtained. This is diazotised analogously to Example 1 and yields the corresponding dyestuffs with the coupling components indicated in Table I.

If the compound of the formula 1 is reacted with 2,6-dichloro-4-methoxy-triazine, 2,6-dichloro-4-ethoxy-triazine, 2,6-dichloro-4-i-propoxy-triazine, 2,6-dichloro-4-(2-hydroxyethyl)-triazine, tetrachloropyrimidine, 2,4,6-trichloro-5-carboxymethyl-pyrimidine, 2,6-difluoro-5-chloropyrimidine, 2,4,6-trifluoro-5-carboxyethyl-pyrimidine or 2,4-difluoro-5-chloro-6-(4-nitrophenoxy)-pyrimidine in the presence of acid-binding agents, as known from the literature, diazo components with further reactive radicals are obtained.

After diazotisation, and coupling of the products with the components indicated in Table I, the corresponding dyestuffs are obtained.

If 4-nitroaniline is diazotised in a known manner instead of 1-amino-4-oxalylamino-benzenesulphonic acid, and the procedure of Example 1 is followed, the triazole compound

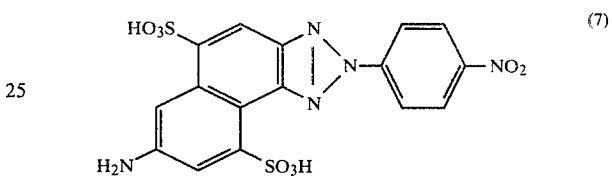

is obtained. The reduction of the nitro group in accordance with the customary processes, with iron or hydrogen/Raney nickel, and subsequent reaction of the compound with 2,4,6-trifluoro-5-chloro-pyrimidine yields the diazo component

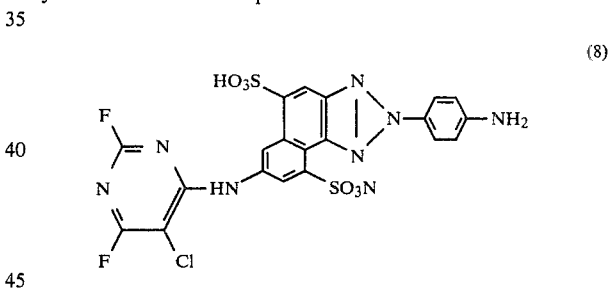

Its diazotisation and coupling analogously to Example 1 yields the dyestuffs indicated in Table II. They show the indicated colour shades and dye cotton in these shades.

TABLE II

| Diaso Component | Coupling Component | Colour Shade |
|---|---|---|
| ![structure] | 1-(4-Sulpho-phenyl)-3-methyl-5-pyrasolone | yellow |

TABLE II-continued

| Diaso Component | Coupling Component | Colour Shade |
|---|---|---|
| (structure: diazo with HO₃S, N, F, N, N, F, Cl, HN, SO₂H) | (structure: phenyl-NH₂ linked to O—Cu—O bridged bis-aryl with N=N, SO₃N) | brown |
| (same diazo core as above) | 8-Acetylamino-1-naphthol-3,5-disulphonic acid | red |
| (same diazo core as above) | 2-Hydroxy-naphthalene-6,8-disulphonic acid | scarlet |

EXAMPLE 2

20.3 g (0.1 mol) of 1-amino-4-methoxy-3-benzenesulphonic acid are dissolved in 600 ml of ice water to give a neutral solution, and 6.9 g of sodium nitrite are added. 28 ml of hydrochloric acid are poured into the mixture, which is allowed to continue to react for 15 minutes, and any excess nitrous acid is then destroyed with amidosulphonic acid. The resulting suspension is added to a solution of 17.4 g of 3-amino-4-methoxy-toluene.HCl in 200 ml of water and the mixture is buffered with sodium acetate at pH=5. After completion of coupling, the precipitate is isolated. It is dissolved under neutral conditions in 800 ml of water at 40° and after adding 6.9 g of sodium nitrite the solution is allowed to run into 28 ml of hydrochloric acid. After one hour, any excess nitrous acid is destroyed with amidosulphonic acid, 31.8 g of 1,6-diamino-naphthalene-4,8-disulphonic acid are sprinkled into the mixture and the whole is buffered with sodium acetate at pH=4. After the end of the reaction, the precipitate is filtered off and transferred into 900 ml of water and 90 ml of ammonia (concentrated). The mixture is warmed to 85°-90° and 56 g of copper sulphate are added. After about 4 hours, no further starting product is detectable. 30 g of sodium hydroxide are added, the mixture is boiled for one hour, and copper oxides which have precipitated are filtered off. Thereafter the solution is neutralised with hydrochloric acid and 10.5 ml of 2,4,6-trifluoro-5-chloro-pyrimidine are introduced dropwise. The pH is maintained at 5 by adding sodium carbonate and after completion of the reaction the reactive component is salted out (5% of sodium chloride). The final dyestuff is isolated and dried in vacuo at 40°. In the form of the free acid, it has the formula:

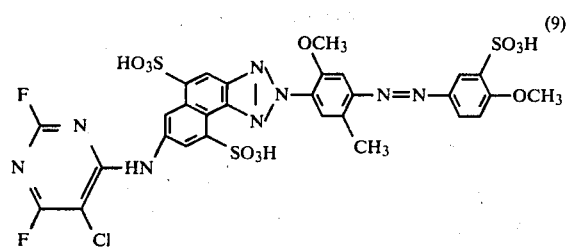

(9)

It is a yellow powder which dissolves in water and dyes cotton in yellow shades.

Analogously to the process of Example 2, further dyestuffs are obtained by using the starting component S, the middle component M and the final component F, as can be seen from Table III. This in part yields aminoazo compounds free of sulphonic acid groups, which can be directly diazotised further in the usual manner. The dyestuffs possess the indicated colour shades and dye cotton in these shades. After coupling with the final component F and triazolysing, reaction with the reactive components mentioned in Example 1 yields the corresponding reactive dyestuffs.

TABLE III

| Starting Component S | Middle Component M | Final Component F | Colour Shade |
|---|---|---|---|
| 1-Amino-4-methoxy-benzene-3-sulphonic acid | 1-Amino-3-methyl-benzene | 1,6-Diamino-naphthalene-4,8-disulphonic acid | yellow |
| 1-Amino-4-ethoxy-benzene-3-sulphonic acid | 3-Amino-4-methoxy-toluene | 1,6-Diamino-naphthalene-4,8-disulphonic | yellow |

TABLE III-continued

| Starting Component S | Middle Component M | Final Component F | Colour Shade |
|---|---|---|---|
| 1-Amino-4-methoxy-benzene-3-sulphonic acid | Amino-benzene | 1,6-Diamino-naphthalene-4,8-disulphonic acid | yellow |
| 1-Amino-4-methoxy-benzene-3-sulphonic acid | 1-Amino-2-methyl-benzene | 1,6-Diamino-naphthalene-4,8-disulphonic acid | yellow |
| 1-Amino-4-methoxy-benzene-3-sulphonic acid | 1-Naphthylamine-6-sulphonic acid | 1,6-Diamino-naphthalene-4,8-disulphonic acid | yellow |
| 1-Amino-4-methoxy-benzene-3-sulphonic acid | 1-Amino-2-ethoxy naphthalene-6-sulphonic acid | 1,6-Diamino-naphthalene-4,8-disulphonic acid | yellow |
| 1-Amino-4-methoxy-benzene-2-sulphonic acid | 1-Amino-2-methyl-benzene | 1,6-Diamino-naphthalene-4,8-disulphonic acid | yellow |
| 1-Amino-4-methoxy-benzene-2-sulphonic acid | 1-Naphthylamine-7-sulphonic acid | 1,6-Diamino-naphthalene-4,8-disulphonic acid | yellow |
| 4-Methoxy-aniline | 1-Naphthylamine-7-sulphonic acid | 1,6-Diamino-naphthalene-4,8-disulphonic acid | yellow |
| 4-Methoxy-aniline | 3-Amino-4-methoxy-toluene | 1,6-Diamino-naphthalene-4,8-disulphonic acid | yellow |
| 4-Ethoxy-aniline | 3-Methyl-aniline | 1,6-Diamino-naphthalene-4,8-disulphonic acid | yellow |
| 1-Amino-4-methoxy-3-benzenesulphonic acid | 1-Naphthylamine-7-sulphonic acid | 1,6-Diamino-naphthalene-4,8-disulphonic acid | yellow |
| 1-Amino-4-methoxy-3-benzenesulphonic acid | 1-Naphthylamine-7-sulphonic acid | 4,8-Diamino-naphthalene-2,6-disulphonic acid | yellow |
| 1-Amino-4-methoxy-3-benzenesulphonic acid | 1-Naphthylamine-7-sulphonic acid | 1,3-Diaminobenzene | yellow |

We claim:

1. Metal-free or metalized azo dyestuff which in the form of the free acid has the formula

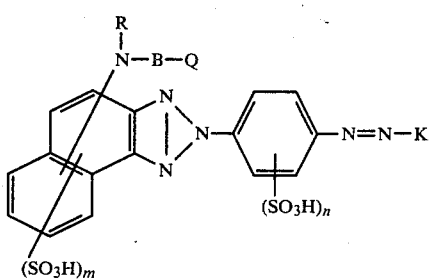

wherein

K is the radical of a coupling component of the acetoacetic acid arylide, pyrazolone or pyrimidone series;

Q is fiber-reactive radical of the pyrimidine, triazine or quinoxaline series;

B is a direct bond, —CO— or —SO₂—;

R is H or $C_1$-$C_4$-alkyl;

m is 0, 1 or 2; and n is 0, 1 or 2.

2. A metal-free or metalized azo dyestuff of claim 1 which in the form of the free acid has the formula

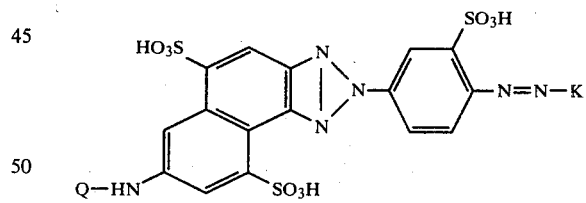

wherein Q and K are defined as in claim 1.

* * * * *